United States Patent

Long

Patent Number: 5,522,328
Date of Patent: Jun. 4, 1996

[54] SEED BRAKE

[75] Inventor: John D. Long, Ankeny, Iowa

[73] Assignee: Deere & Company, Moline, Ill.

[21] Appl. No.: 404,775

[22] Filed: Mar. 15, 1995

[51] Int. Cl.$^6$ ................................................ B65G 51/20
[52] U.S. Cl. ............... 111/176; 406/83; 406/195; 406/196; 222/630; 221/211; 221/278
[58] Field of Search ...................... 111/176, 174; 406/195, 191, 196, 83; 222/630; 221/278, 211

[56] References Cited

U.S. PATENT DOCUMENTS

| | | | |
|---|---|---|---|
| 885,069 | 4/1908 | Mullikin | 406/195 X |
| 3,332,724 | 7/1967 | Doucet | 406/83 X |
| 3,474,746 | 10/1969 | Hiniker | 406/195 X |
| 3,964,639 | 6/1976 | Norris et al. | 221/278 |
| 4,685,843 | 8/1987 | Kelm | 406/195 X |
| 4,779,765 | 10/1988 | Neumeyer | 222/630 X |
| 5,154,545 | 10/1992 | Morimoto et al. | 406/195 X |
| 5,392,722 | 2/1995 | Snipes et al. | 111/174 |

FOREIGN PATENT DOCUMENTS

| | | | |
|---|---|---|---|
| 434589 | 4/1973 | Australia. | |
| 1192238 | 8/1985 | Canada | 406/195 |
| 0110055 | 7/1986 | European Pat. Off.. | |
| 720298 | 4/1942 | Germany | 406/195 |
| 921917 | 12/1954 | Germany | 406/195 |

OTHER PUBLICATIONS

Dutch Industries Ltd., single page from brochure, located in Regina, Saskatchewan, Canada.

*Primary Examiner*—Dave W. Arola
*Assistant Examiner*—Christopher J. Novosad

[57] ABSTRACT

A seed brake for a pneumatic agricultural seeding and/or fertilizing machine. The seed brake comprises a curved tube having an inner curved side and an outer curved side. The inner curved side is provided with an opening. The inner curved side is also provided with a baffle located between the opening and the outlet of the tube. The baffle extends into the tube and is integrally formed with the inner curved side. The baffle is formed by kinking the tube.

5 Claims, 2 Drawing Sheets

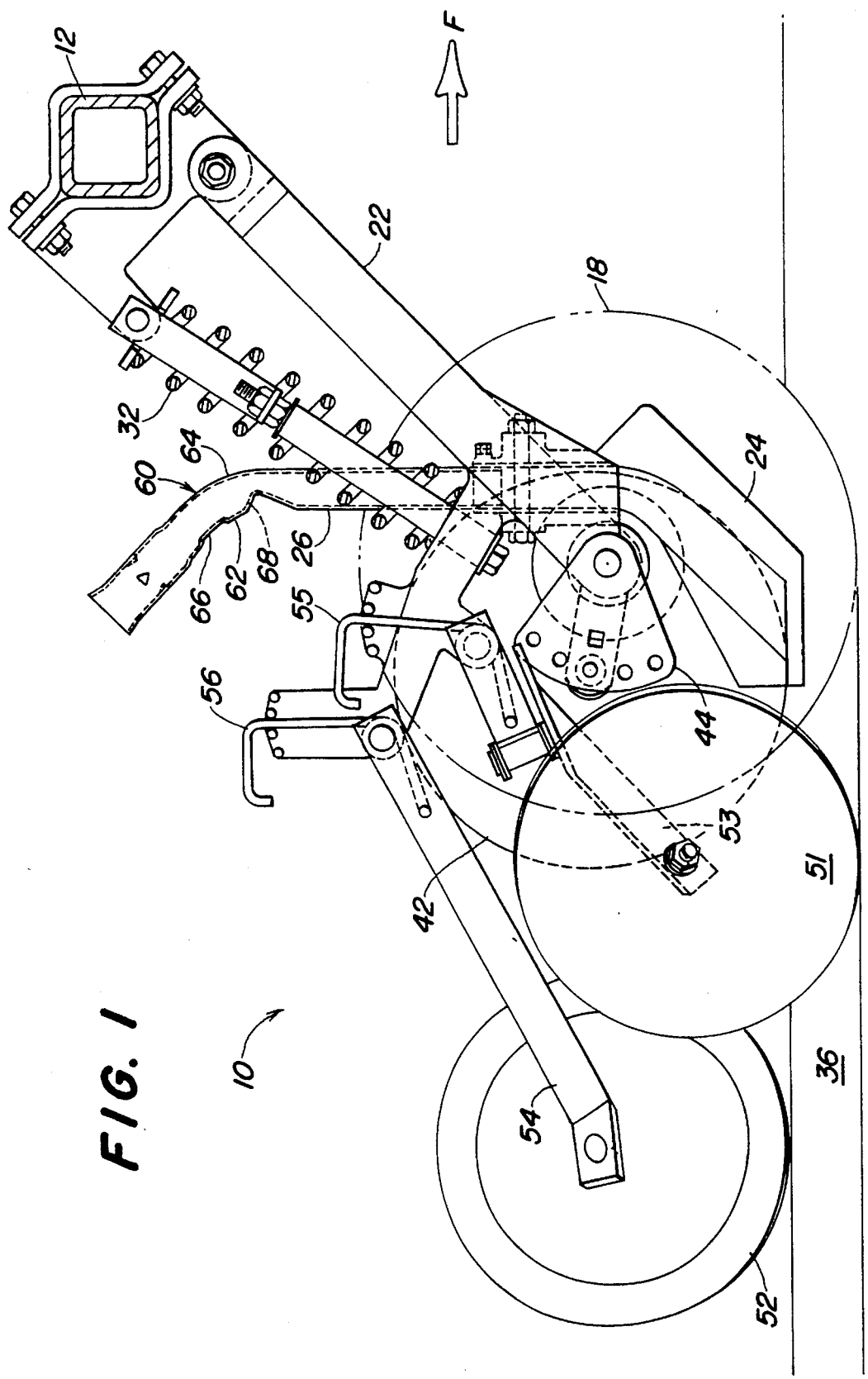

5,522,328

SEED BRAKE

BACKGROUND OF THE INVENTION

1. Field of the Invention

The present invention is directed to a seed brake for reducing the speed of seed and/or fertilizer entrained in an air stream.

2. Description of the Prior Art

Large pneumatic seeding and fertilizing machines entrain metered seed and fertilizer in high speed air streams before directing it to a planting furrow. The high velocity of the air stream may cause the seed and fertilizer to bounce or to be blown out of the planting furrow. To overcome this problem air brakes have been proposed to remove the pressurized air and slow down the seed or fertilizer before it enters the planting furrow.

One proposal is to provide an air diffuser upstream from the planting furrow which comprises a perforated tube, see U.S. Pat. No. 3,964,639. U.S. Pat. No. 5,392,722 discloses another type of air diffuser used in a mini-hopper. Australian Patent 434,589 discloses a curved tube air diffuser having a plurality of holes.

Dutch Industries Ltd. of Regina Saskatchewan, Canada, markets a Dutch Seed Brake comprising an enlarged tube section having a plurality of holes in which is located a baffle.

SUMMARY

It is an object of the present invention to provide a seed brake for releasing pressurized air, wherein the flow and passage of seed and/or fertilizer through the seed brake are unhindered.

The present invention comprises a tube having an inlet for receiving seed and/or fertilizer and an outlet for dispensing seed and/or fertilizer from the tube. The tube has a curved portion with an inner curved side and an outer curved side. The inner curved side is provided with an opening for releasing pressurized air from the tube. A baffle is provided between the opening and the outlet on the inner curved side of the tube. The baffle extends into the tube from the inner curved side. The baffle is integrally formed with the inner curved side by kinking the tube.

BRIEF DESCRIPTION OF THE DRAWINGS

FIG. 1 is a side view of an individual planting unit.

DETAILED DESCRIPTION

Figure 3:
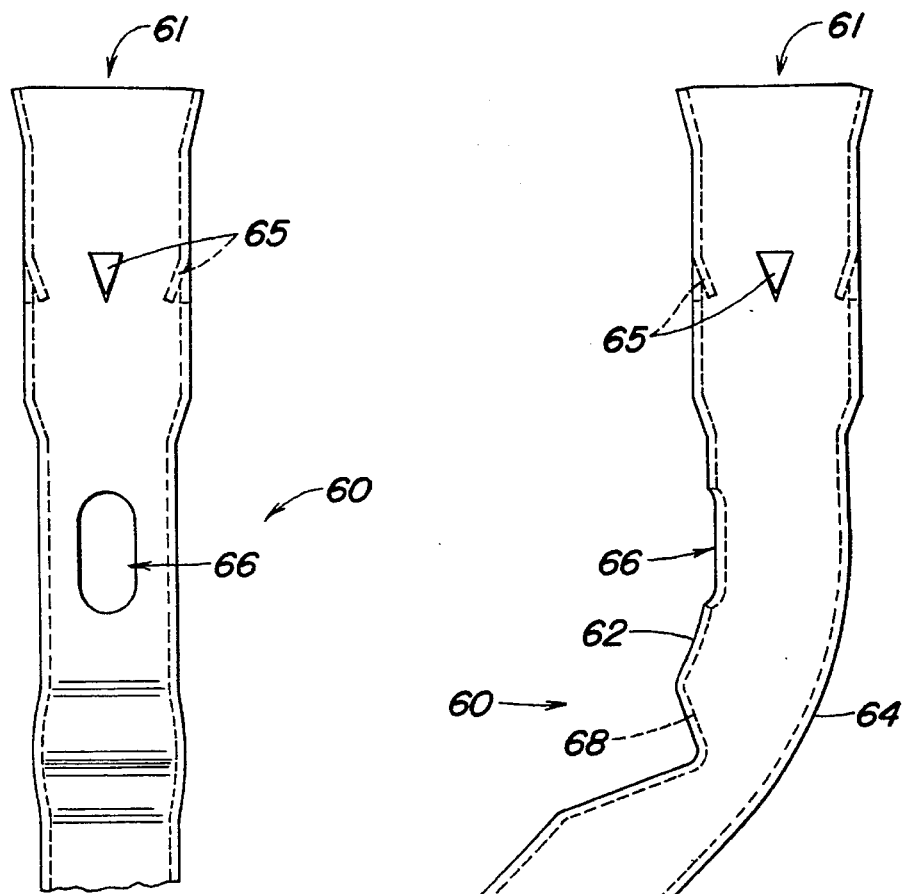
FIG. 3 is a partial rear view of the seed brake of the present invention.
Figure 2:
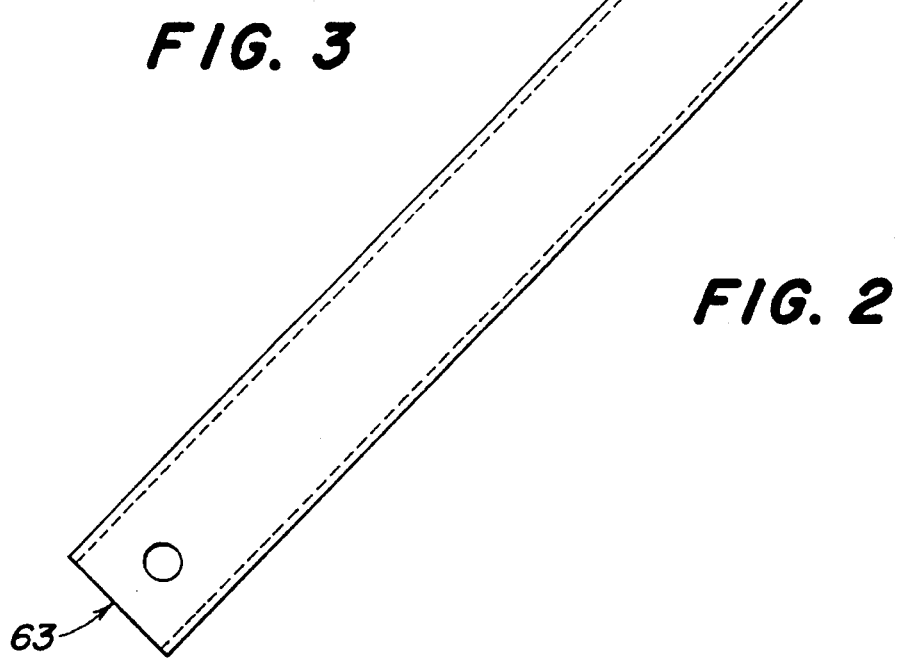
FIG. 2 is a side view of the seed brake of the present invention.

Referring now to FIG. 1, therein is shown an agricultural seeding machine having a furrow opener assembly 10 supported from a frame member 12 of a grain drill or similar seeding implement adapted for forward movement F over a field. The furrow opener assembly 10 comprises an angled opener disk 18 supported from a drawbar 22 for rotation about an axis angled from the transverse direction. A seed boot 24 is supported closely adjacent the disk 18 in the shadow of the leading edge of the disk. The seed boot 24 is provided with a steel seed tube 26 which is connected to a metered source of seeds (not shown).

A down-pressure spring assembly 32 biases the opener disk 18 into the soil to open a planting furrow 36. A depth adjustment wheel 42 is supported for rotation adjacent the leading side of the disk 18 about an axis offset from the axis of the disk. Furrow depth is controlled with an adjustment mechanism 44 which moves the axis of the wheel 42 vertically with respect to the disk 18.

Seed lock wheel 51 and closing wheel 52 are supported rearwardly adjacent the disk 18 from arms 53 and 54, respectively. The seed lock wheel normally runs in the planting furrow for pressing the seeds to the furrow providing good seed-soil contact. The closing wheels crush the side of the furrow thereby covering the seeds and providing a loose layer of soil over the seeds. Seed locking and furrow closing force may be adjusted by down-pressure spring assemblies 55 and 56.

The seed boot 24 is provided with a steel seed tube 26 that extends upwardly above the furrow opener 10. The seed brake of the present invention is part of this tube. The seed tube is provided with an inlet 61 for receiving seeds and/or fertilizer and an outlet 63 for dispensing seeds and/or fertilizer. The tube is further provided with a curved portion 60 having a inner curved side 62 and an outer curved side 64. The inlet portion of the seed tube is provided with inwardly projecting tongs 65 for mounting a plastic seed tube to the inlet portion.

An air opening 66 is formed in the inner curved side 62. Seed as it is propelled through the tube by the high velocity air stream gravitates to the outer curved side 64 of the seed brake because of centrifugal force. Immediately downstream from the opening 66 is a baffle 68 which causes a back pressure effect in the tube upstream from the baffle so that pressurized air is forced out the opening 66.

Baffle 68 extends approximately halfway into the tube from the inside curved side. The baffle is integrally formed with the inner curved side by kinking the tube. Another way of forming the baffle would be to cut an angled slot in the tube and insert and weld a plate in place to form the baffle. By locating the baffle on the inside curved side the flow and passage of seed and or fertilizer is left unhindered.

The above discussed invention can be used with all types of particulate matter including seeds and/or fertilizer. As such it should not be limited to the above described embodiments, but should be limited solely by the claims that follow.

I claim:

1. A seed brake for an agricultural seeding machine wherein particulate matter is delivered to a planting furrow by an air stream, the seed brake comprising:

a tube having an inlet for receiving particulate matter and an outlet for dispensing particulate matter, the tube is provided with a curved portion located between the inlet and the outlet, the curved portion is provided with an inner curved side and an outer curved side;

the inner curved side is provided with an opening for removing air from the tube; and a baffle is positioned between the opening and the outlet, the baffle extends from and is integrally formed with the inner curved side.

2. A seed brake as defined by claim 1 wherein the baffle is formed by kinking the tube.

3. A seed brake for an agricultural seeding machine wherein particulate matter is delivered to a planting furrow by an air stream, the seed brake comprising:

a tube having an inlet for receiving particulate matter and an outlet for dispensing particulate matter, the tube is provided with a curved portion located between the inlet and the outlet, the curved portion is provided with an inner curved side and an outer curved side;

the inner curved side is provided with an opening for removing air from the tube; and a baffle is positioned between the opening and the outlet, the baffle is integrally formed with the inner curved side.

4. A seed brake as defined by claim 3 wherein the baffle is formed by kinking the tube.

5. A seed brake for an agricultural seeding machine wherein particulate matter is delivered to a planting furrow by an air stream, the seed brake comprising:

a tube having an inlet for receiving particulate matter and an outlet for dispensing particulate matter, the tube is provided with a curved portion located between the inlet and the outlet, the curved portion is provided with an inner curved side and an outer curved side;

the inner curved side is provided with an opening for removing air from the tube; and a baffle is positioned between the opening and the outlet, the baffle is formed by kinking the tube.

* * * * *